United States Patent [19]

Sgrignoli

[11] Patent Number: 4,790,010

[45] Date of Patent: Dec. 6, 1988

[54] ENHANCED SCRAMBLING METHOD AND SYSTEM FOR TV SIGNALS

[75] Inventor: Gary J. Sgrignoli, Mount Prospect, Ill.

[73] Assignee: Zenith Electronics Corporation, Glenview, Ill.

[21] Appl. No.: 18,145

[22] Filed: Feb. 24, 1987

[51] Int. Cl.$^4$ ............................................. H04N 7/167
[52] U.S. Cl. ......................................... 380/10; 380/15; 380/16
[58] Field of Search ..................... 380/10, 13, 16, 15; 455/1, 181

[56] References Cited

U.S. PATENT DOCUMENTS

| | | | |
|---|---|---|---|
| 3,777,053 | 12/1973 | Wittig et al. | 380/16 |
| 3,899,633 | 8/1975 | Sorenson et al. | 380/7 |
| 4,039,954 | 8/1977 | den Toonder | 455/1 |
| 4,232,396 | 11/1980 | Grimes | 380/13 |
| 4,317,213 | 2/1982 | DiLorenzo | 455/1 |
| 4,353,088 | 10/1982 | den Toonder et al. | 380/7 |
| 4,396,946 | 8/1983 | Bond | 380/15 |
| 4,510,623 | 4/1985 | Bonneau et al. | 455/181 |
| 4,590,519 | 5/1986 | Zelenz | 380/15 |
| 4,599,646 | 7/1986 | Cottam | 380/15 |
| 4,636,852 | 1/1987 | Farmer | 380/15 |

*Primary Examiner*—Salvatore Cangialosi

[57] ABSTRACT

A television signal transmission system includes a cable head-end having a scrambler for scrambling a television signal and a subscriber decoder having an unscrambler for unscrambling the television signal in response to data signals from the transmitter. The unscrambler in the receiver is operated to unscramble the scrambled signal for authorized subscribers and to further scramble the scrambled signal for unauthorized subscribers.

8 Claims, 2 Drawing Sheets

ENHANCED SCRAMBLING METHOD AND SYSTEM FOR TV SIGNALS

BACKGROUND OF THE INVENTION AND PRIOR ART

This invention relates generally to television signal transmission and receiving systems and particularly to scrambled signal transmission formats for use in subscription or pay television applications.

In subscription television systems, signals are transmitted, either "over the air" or over a suitable cable network, in a scrambled form which renders the broadcast video information largely unviewable on a conventional television receiver. In order to view the video display, each subscriber is provided with a decoder for unscrambling the broadcast signals and for coupling the unscrambled signals to a television receiver. A major consideration in designing a scrambling system is security to prevent unauthorized use of the broadcast information by non-paying subscribers. On the other hand, the scrambled signals must be capable of reliable decoding by authorized system subscribers and the system must be reasonably economical.

In addition to security problems, a cable or subscription television operator must be concerned about material that is "privately" broadcast, to subscribers of a certain service or channel, being considered offensive or distasteful to non-subscribers of the service or channel. Since it is often only the scrambling that prevents non-subscribers from viewing the material, the scrambling system should be capable of providing a "depth of scrambling" that would effectively preclude a non-subscriber from being offended by "seeing through the scrambling" of the video display. This consideration is quite important when dealing with adolescent viewers, for example. In scrambling systems that operate at baseband frequencies, the display on the television receiver cathode ray tube may be readily "blanked," that is, have no video displayed thereon, for unauthorized channels. However, many decoding systems operate at only RF frequencies and in such systems, blanking of the video display is not readily accomplished. In some RF systems, the decoder includes a channel tuner that may be tuned by the decoder controller to another channel in the event that the channel to which the tuner is tuned by the subscriber is not an authorized channel. These authorization and control systems are well-known in the art. In many systems, the decoder is actually tuned to a so-called "homing channel" when it is turned "off." In reality, the decoder is "on" and remains active to accept control signals from the cable head-end. With RF systems, complete isolation of signals is almost impossible, and it is not uncommon for signals to still be coupled, albeit very weakly, to a television receiver, even when the decoder is "off." Although the display may be snowy, it may still be viewable. Even though the signal is scrambled, the depth of scrambling may be insufficient and offensive material may still be partially viewable to nonsubscribers. Accordingly, there is a need in the art for a television signal scrambling system that is economical, yet effective, even at RF frequencies.

OBJECTS OF THE INVENTION

A principal object of the invention is to provide a novel television transmission system.

Another object of the invention is to provide a television scrambling system of enhanced scrambling characteristics.

A further object of the invention is to provide a novel method of enhancing the scrambling of the television signals.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENTS

The invention in its broadest aspects will be seen to be useful with any type of scrambling system in which a scrambled television (TV) signal is sent from a station or head-end to subscribers who are equipped with suitable unscrambling apparatus. The unscrambling apparatus is enabled, responsive to appropriate signals from the head-end, for unscrambling the scrambled transmissions. Thus, operation for authorized subscribers remains the same as it is currently, i.e., the unscrambling means at each subscriber location is operated in synchronism with the scrambling means at the head-end for unscrambling the display at the subscriber's TV set. The distinction is that for unauthorized subscribers, the unscrambling means at the subscriber location is operated in an asynchronous manner rather than simply being disabled. Asynchronous operation of the decoder results in enhanced scrambling of the scrambled television signal and greatly minimizes the possibility that unauthorized subscribers will be able to see through the scrambling. Consequently, the fear that some subscribers may be offended by certain broadcast materials is substantially alleviated with the system of the invention.

The invention will be described as it applies generally to conventional cable television subscription systems. In such systems, each subscriber unit or decoder includes a microprocessor controller that enables various functions of the subscriber decoder. The cable system may have a plurality of classes or tiers of service to which the subscriber is given access upon request and payment of appropriate fees. These tiers or classes of service may be identified by different bits in a multi-bit memory in the subscriber unit microprocessor. Periodically, the head-end communicates with each subscriber unit individually and sets the authorizational level for that unit by setting the appropriate bits in the subscriber unit microprocessor memory. Each subscriber unit also includes appropriate apparatus for responding to transmitted data, either in a television signal or on a separate carrier, for controlling the enabling of appropriate descrambling means. Thus when the head-end transmits a television signal, along with data in the form of a program tag or tier indication, a subscriber unit decodes the program tag and checks it against its authorization memory. If the subscriber unit is authorized for the service defined by that program tag, the unscrambling means in the subscriber unit is activated to enable the television signal to be unscrambled for viewing. If the program tag does not correspond to one for which the subscriber unit is authorized, the unscrambling means is not activated. In some systems, the unscrambled video is blanked from the screen from the unauthorized subscriber TV, whereas in others, it is viewable in scrambled form. In still other systems, the signal may be switched to a different channel which may not be viewable by the subscriber.

Figure 1:
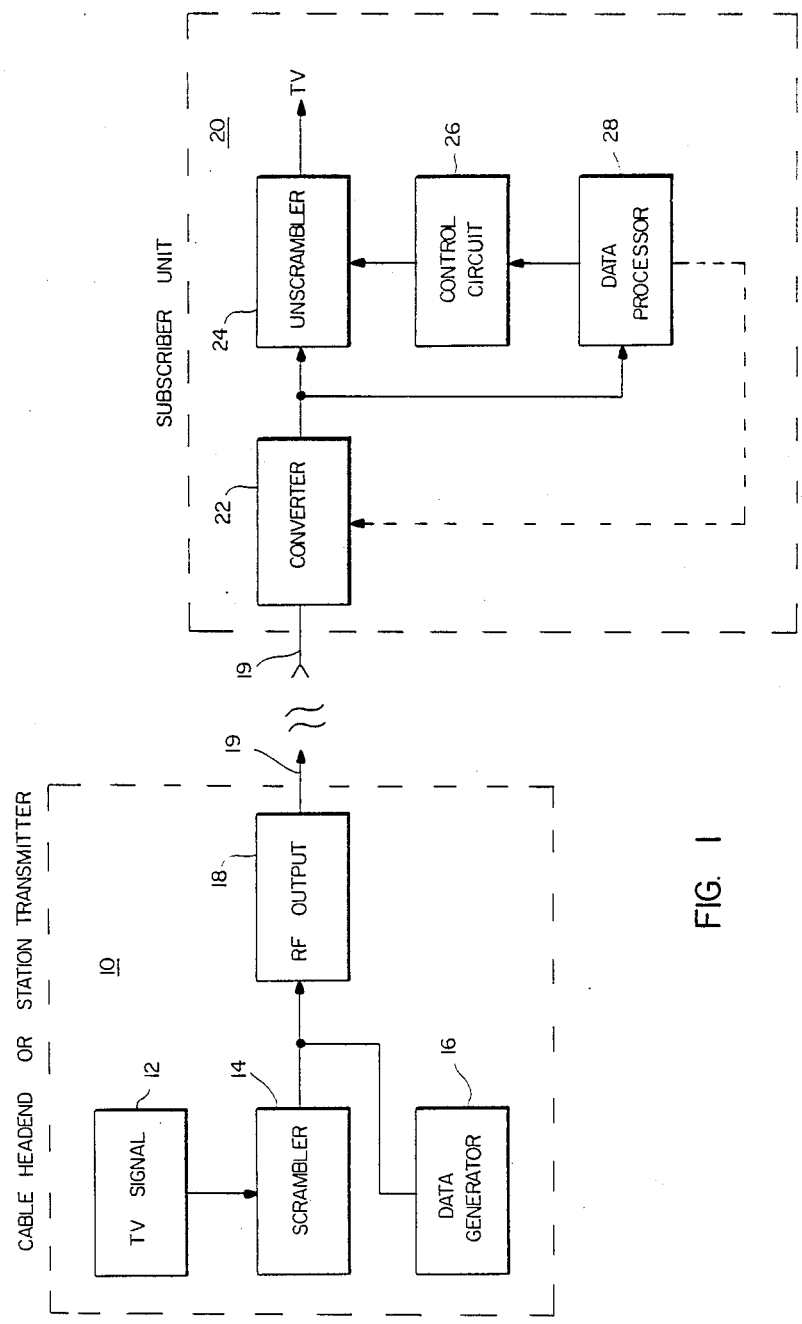
FIG. 1 is a simplified block diagram of a television transmission system constructed in accordance with the invention.

In FIG. 1, a cable head end or station transmitter 10 is arranged to transmit scrambled television signals to a subscriber unit 20 located at a subscriber site, over a cable link 19. The cable link may, of course, be an antenna system and while the invention will be described in terms of a cable system, it is not limited to a cable system. A source of TV signal 12 is supplied to a scrambler 14 which supplies a scrambled TV signal to an RD output 18. A data generator 16 is coupled to the input of RF output 18 and, as discussed above, may comprise means for transmitting authorization codes and the like to the various subscriber units served by the cable network. Data communication from the head-end may either be "in-band" or "out-of-band." In "in-band" systems, the data is included in the TV signal, generally in the vertical interval, and in "out-of-band" systems, it is provided on a separate carrier. The point of interest is that the data generator provides the requisite data for establishing the various authorization levels in the memories of the microprocessors of the different subscriber units. Also as previously mentioned, the television signals include program tags that identify the authorizational level required for enabling the individual subscriber unit to unscramble the signal. The showing is diagrammatic only, it being understood that the various apparatuses for transmitting the television signals and program tags and for communicating authorization codes to the cable-connected subscriber units are well-known to those skilled in the art.

A typical subscriber unit 20 includes a converter 22 that has an output coupled to an unscrambler 24, a control circuit 26 and a data processor 28. Converter 22 may be part of or separate from subscriber unit 20. Data processor 28 is also coupled to control circuit 26 and control circuit 26, in turn, is coupled to unscramlber 24. The output of unscrambler 24 is supplied to a television receiver (not shown). The dashed line coupling data processor 28 back to converter 22 illustrates a connection for changing the channel tuning of converter 22, in an appropriate system. In accordance with the invention, control circuit 26 is provided for receiving the output of data processor 28 and either permitting unscrambling of the scrambled signal by unscrambler 24 or enabling further scrambling of the signal by unscrambler 24. Thus in response to an appropriate signal from data processor 28, indicating that the subscriber unit is authorized to receive the program bearing the particular program tag, control circuit 26 functions to permit unscrambling of the scrambled TV signal by unscrambler 24. In the absence of the appropriate authorization code for the signal being received, control circuit 26 causes the unscrambler 24 to further scramble the scrambled TV signal to increase the depth of scrambling.

Figure 2:
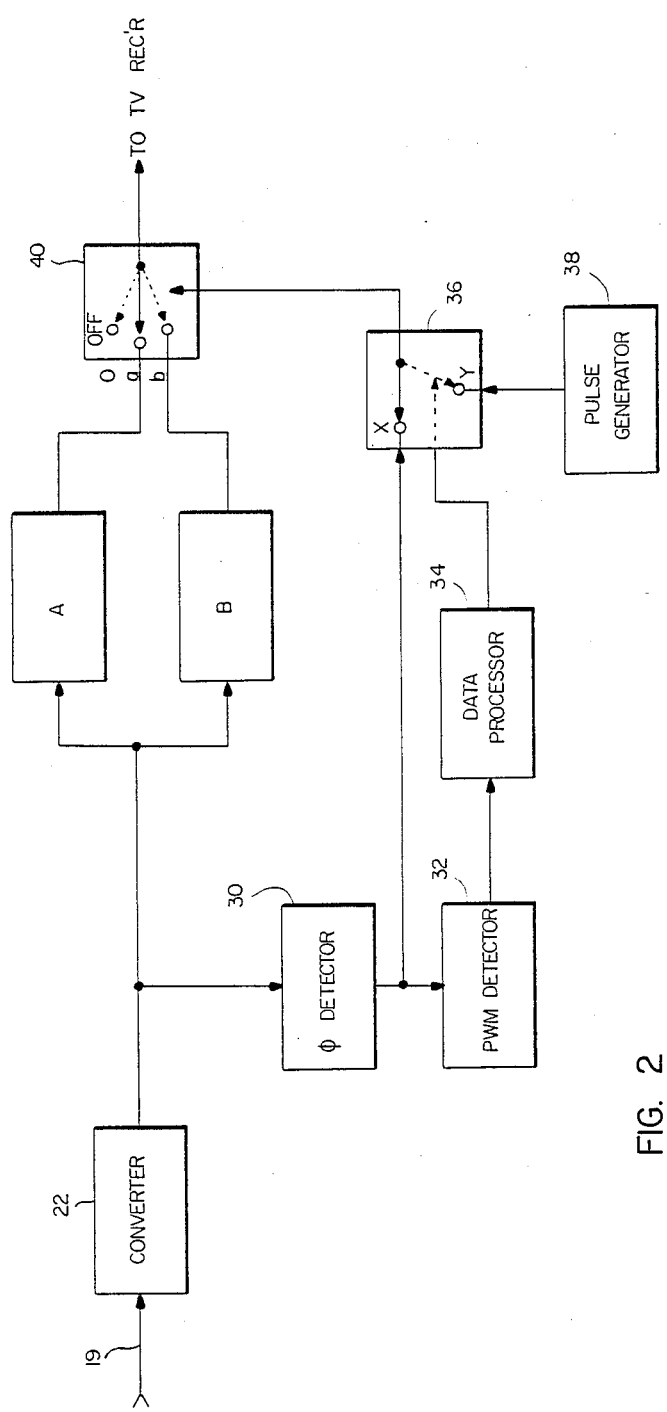
FIG. 2 is an alternative embodiment of the invention of FIG. 1.

FIG. 2 discloses a subscriber unit in an RF type system in which the output of converter 22 is coupled to a phase detector 30 that in turn supplies a pulse width modulation (PWM) detector 32 and a switch means 36. The output of PWM detector 32 is supplied to a data processor 34 which in turn is coupled to switch means 36. A pulse generator 38, that is preferably randomly operated with respect to the pulse train developed by PWM detector 32, is also coupled to switch means 36. Converter 22 also is coupled to a pair of filters that are labelled A and B, respectively. The outputs of filters A and B are coupled to respective second and third contacts of a switch 40, the first contact of which is indicated as an OFF position. The movable contact of switch 40 is connected to a television receiver (not shown).

Scrambling is accomplished by suppressing the amplitude and changing the phase of the carrier during selected horizontal blanking intervals. The particular system is fully disclosed in U.S. Pat. No. 4,467,353. Phase detector 30 is of the synchronous type and detects the change in phase of the carrier, which change is used to control operation of switch 40, via switch means 36. Filters A and B receive the output of converter 22 and selectively apply it to the subscriber television receiver (not shown) through switch 40. Filter A may have a substantially flat frequency response whereas filter B may have a frequency response that is the complement of the coding filter that is used for scrambling the television signal. Switch 40 couples either the output of the A filter or of the B filter to the television receiver and is controlled by switch means 36. Thus, for example, if the scrambling system suppresses the sync and reverses the carrier phase during a horizontal interval, the response of filter B would be such that the sync is restored to its proper amplitude and the carrier phase changed accordingly to provide a proper (unscrambled) signal during the interval. Unscrambled signal portions would be passed through filter A, with the result being, that by appropriate operation of switch 40, an unscrambled television signal is made available to the TV receiver.

As mentioned, phase detector 30 is responsive to the phase changes of the scrambled signal and develops an output that is a rectangular pulse which reflects these changes. Consequently, the output of phase detector 30 can be used to synchronously control operation of switch 40 for unscrambling the signal. That arrangement is in the prior art. Switch means 36 are provided for enabling only authorized subscribers to properly operate switch 40. In the system under discussion, the horizontal interval is varied with a wide interval indicating a first binary state of data and a narrow interval indicating a second binary state of data. The difference in horizontal widths is detected by PWM detector 32 and the information processed by data processor 34 for controlling operation of switch means 36 such that only authorized subscriber units have phase detector 30 coupled to control operation of switch 40 to decode the signal. In the invention, a pulse generator 38 also controls switch 40 (via switch means 36) for operating switch 40 in an asynchronous manner for enhancing or further scrambling the scrambled television signal. Specifically, when the output of data processor 34 indicates that the subscriber is not authorized for the received TV signal, switch means 36 is placed in its Y position and the asynchronous output of pulse generator 38 is used to control the operation of switch 40. This effectively increases the depth of scrambling of the signal. In the preferred embodiment illustrated, for authorized operation switch 40 is switched between positions "a" and "b" corresponding to the outputs of filters A and B, respectively, for descrambling. When the output of pulse generator 38 controls switch 40, the output of filter A is never connected to the television receiver but, rather, switch 40 is moved between positions "b"

and "O" for providing either the scrambled output or a zero output to the television receiver on an alternating basis. This contributes materially to the depth of scrambling of the already scrambled received signal.

It will be appreciated that a plurality of such filters may be included for further increasing the depth of scrambling. The provision of two filters A and B and a third OFF position provides significantly enhanced scrambling at minimum cost and complexity in the subscriber unit. While the system shows an added pulse generator, it should be readily apparent that the output of the phase detector 30 may be used to directly control operation of switch 40 between the "b" and the "O" position rather than the "b" and the "a" positions to further enhance scrambling of the descrambled signal. It will be noted that the switch means 36 and switch 40 are shown as mechanical switches for illustrative purposes only. In practice, they are semiconductor devices and are effectively controlled by logic to produce the operation described.

While the particular unscrambler illustrated is for use with the above-mentioned patented RF scrambling system, it should be readily apparent that the invention is not so limited. The invention broadly contemplates operating any unscrambling means in a manner to further enhance or deepen the scrambling of the scrambled signal when it is received by a non-authorized receiver. The enhanced scrambling can be obtained at no added decoder cost in one embodiment of the invention by utilizing unscrambling hardware already in the decoder. Consequently, it is an extremely attractive solution for existing cable or subscription television systems.

It will be appreciated that numerous modifications in the described embodiments of the invention will be apparent to those skilled in the art without departing from its true spirit and scope. The invention is to be limited only as defined in the claims.

What is claimed is:

1. A method of operating a television communication system including scrambling means at a transmitting station and unscrambling means at a receiving station comprising the steps of:
   transmitting a scrambled television signal and a data signal;
   receiving said scrambled television signal and said data signal and under control of said data signal, selectively;
   operating the unscrambling means at the receiving station for unscrambling said scrambled television signal; and
   operating the unscrambling means at the receiving station for further scrambling said scrambled television signal.

2. The method of claim 1 wherein said scrambled television signal has suppressed amplitude and an inverted carrier phase during selected horizontal blanking intervals and wherein said data signal is defined by the width of the horizontal intervals.

3. The method of claim 2 wherein said unscrambling means comprises a pair of filters, one of which is adapted for unscrambling the scrambled television signal, and switch means for selectively coupling the outputs of said filters to a common output.

4. A televsion signal decoder comprising:
   means for receiving a scrambled television signal;
   means for receiving and processing a data signal for deriving first and second control signals; and
   unscrambling means, responsive to said first control signal, for unscrambling the received television signal and responsive to said second control signal, for further scrambling the received scrambled television signal.

5. In a television system of the type including scrambling means for generating a scrambled television signal at a transmitting station and unscrambling means at a receiving station for unscrambling the television signal and means for sending a data signal from said transmitting station to said receiving station for controlling operation of said unscrambling means to unscramble the scrambled television signal, the improvement comprising:
   means responsive to said data signal for controlling said unscrambling means to further scramble the scrambled television signal.

6. The system of claim 5 wherein said means for controlling develops synchronous and asynchronous control signals at said receiving station.

7. The system of claim 6 wherein said transmitting station is a cable head-end and said receiving station is a decoder.

8. A method of operating a television communication system including scrambling means at a transmitting station and unscrambling means at a receiving station comprising the steps of:
   transmitting a scrambled television signal;
   receiving said scrambled television signal;
   operating the unscrambling means at an authorized receiving station for unscrambling said scrambled television signal; and
   operating the unscrambling means at an unauthorized receiving station for further scrambling said scrambled television signal.

* * * * *